J. W. SHARP, Jr.
LAVATORY.
APPLICATION FILED AUG. 26, 1916.
1,334,407.
Patented Mar. 23, 1920.
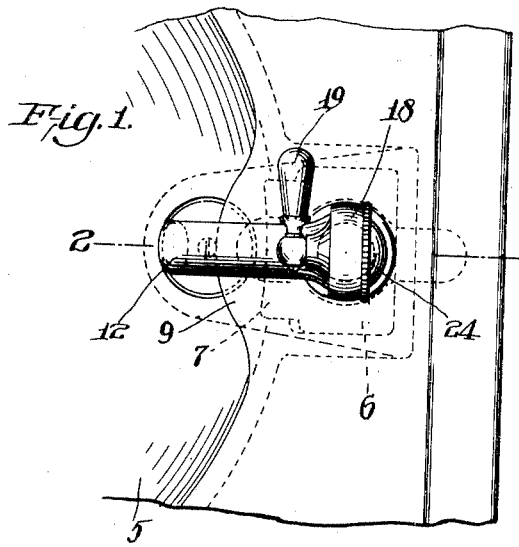
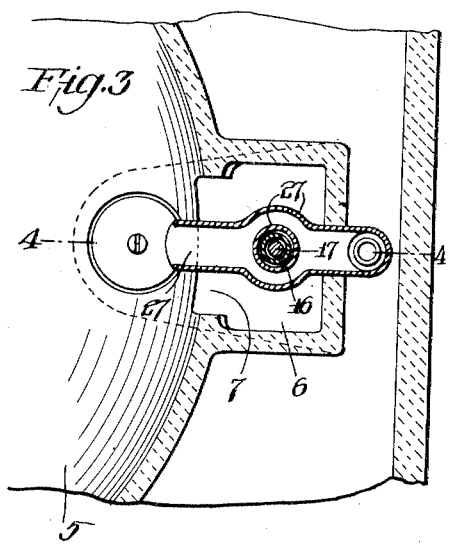
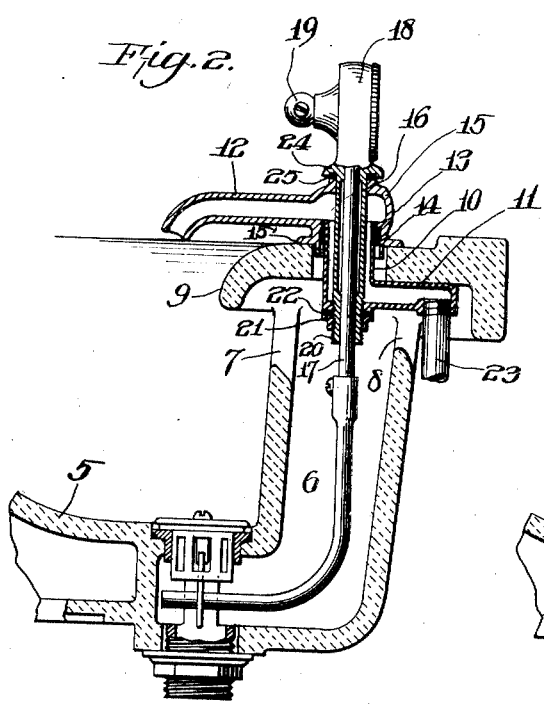
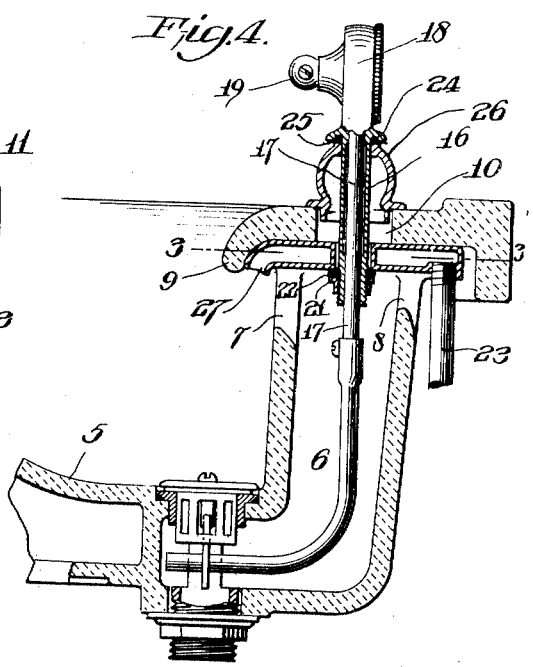
Inventor
Joseph W. Sharp Jr.
By
Attorney

UNITED STATES PATENT OFFICE.

JOSEPH W. SHARP, JR., OF BERWYN, PENNSYLVANIA, ASSIGNOR TO HAINES, JONES & CADBURY, INCORPORATED, A CORPORATION OF PENNSYLVANIA.

LAVATORY.

1,334,407.

Specification of Letters Patent.   Patented Mar. 23, 1920.

Application filed August 26, 1916. Serial No. 116,964.

*To all whom it may concern:*

Be it known that I, JOSEPH W. SHARP, Jr., a citizen of the United States, residing at Berwyn, in the county of Chester, State of Pennsylvania, have invented a new and useful Lavatory, of which the following is a specification.

My invention relates to lavatories or wash basins. The object is to provide an improved combination of basin structure and supply and waste fixtures therefor in which parts of the fixtures are interchangeable for an alternative arrangement in combination with the waste fixtures. The invention comprises improvements in the structure described in my Patent No. 989,816 dated April 18, 1911.

Referring to the drawings, which illustrate merely by way of example, a suitable embodiment of my device—

Figure 1 is a plan view.

Fig. 2 is a section on line 2—2 of Fig. 1.

Fig. 3 is a horizontal section on line 3—3 of Fig. 4.

Fig. 4 is a vertical section on a plan corresponding to line 4—4 of Fig. 3.

Similar numerals refer to similar parts throughout the several views.

The basin 5 to which my fixture is adapted to be applied is of integral structure having the overflow waste channel 6 molded within its walls with overflow opening 7 communicating therewith, at the top of the basin, and the opening 8 in the rear wall and near the top of the basin structure, for receiving the supply fixture. The basin is also provided with the overhanging lip 9, which serves partly to conceal the opening 7, and is also adapted to cover a supply fixture or nozzle 27 placed beneath it, as shown in Fig. 3. Above the channel 6 is an opening 10 through the top wall of the basin structure. This opening 10 is made sufficiently large to accommodate, or to permit the insertion of, the L shaped portion 11 of the supply pipe, which is inserted downwardly through said opening 10 and outwardly through opening 8. The upper end of the vertical extension of this supply pipe section 11, projects into nozzle member 12; the connection being made water-tight by means of the gasket 13 and the nut 14 threaded onto said upper extension of section 11. The nozzle member 12 is provided with a flange 15' which rests upon the top of the basin structure 5.

Through the dome portion 15 of nozzle member 12 projects the tube 16 which forms part of the housing of the waste valve actuating rod 17. This rod is connected by means of the usual eccentric in the housing 18 and is operated by the handle 19. The lower end of tube 16 is threaded as at 20 to receive the nut 21, which serves to hold the washer or gasket 22 against the lower part of section 11 so as to make a water-tight joint between section 11 and tube 16. It will be understood that the water, coming through supply pipe 23, passes through section 11 and, in the vertical part thereof, surrounds the tube 16 and passes out of the nozzle 12.

Between the flange 24 of the housing body 18, is provided a washer 25 which bears upon the top of the dome portion 15 of the nozzle member 12, to maintain a water-tight fit between the tube 16 and the top of dome 15 of nozzle member 12, pressure being exerted between flange 24 and the top of the dome member 15 by the nut 21.

One of the advantages of this construction, comprising the washer or gasket 13 forming a water-tight joint between the supply pipe section 11 and the nozzle member 12 and the washer or gasket 25, forming a water-tight joint between the housing pipe 16 and nozzle member 12, is that the nozzle member 12, may be made of china or similar material, since it need have no threaded connection with the other parts.

The structure above described is clearly shown in Figs. 1 and 2, in which the supply nozzle 12 extends above the top of the basin structure and slightly beyond the overhanging lip 9.

In order to use a nozzle structure similar to that shown in Fig. 8 of my Patent No. 989,816, with the other structure herein described, I provide the means shown in Figs. 3 and 4, using the same waste valve actuating mechanism and the same basin structure without any change therein whatever, but substituting for the nozzle member 12 the dome 26 which supports the housing 18 at the desired elevation above the top of the basin 5 in the same way as it does in the structure shown in Fig. 2. And substituting for the supply section 11 the nozzle member 27, which is a horizontal chambered body connecting directly with the supply pipe 23. This member 27 surrounds the tube member 16 forming part of the housing of the waste valve actuating rod 17, but does not communicate therewith. The housing portion 18 and dome member 16 and nozzle member 27 are all kept in relative positions as shown in Fig. 4 by means of the nut 21 operating against the washer 22 or directly against member 27 and drawing down the flanged portion 24 on the washer 25 upon the dome member 26 and the flange of the dome member upon the top surface of the basin structure. In this way, it will be seen, that simply by substituting members 11 and 12 for members 26 and 27, and vice versa, with the same basin and same valve actuating mechanism the complete structure is produced as shown in Figs. 1 and 2 with the nozzle extending above the top of the basin.

By using members 26 and member 27 instead of members 11 and 12, the structure is produced as shown in Figs. 3 and 4 with the nozzle extending beneath the lip portion 9.

That is to say, by having these interchangeable parts adapted to be applied to the same basin and in combination with the same valve actuating mechanism the plumber may equip the basin either with a supply nozzle projecting above the top of the housing as shown in Figs. 1 and 2, or with the supply nozzle housed beneath the lip 9 as shown in Figs. 3 and 4 whichever may be required.

What I claim is:—

In a lavatory, the combination of a basin having an overhanging lip providing a space for a concealed discharge nozzle, a waste valve and actuating means therefor, including a hand operating device and a housing therefor, located above and in spaced relation with the top of the basin, and a removable nozzle-carrying dome formation engaging with and supporting the housing, and adapted to be detached to permit a nozzle to be arranged beneath the overhanging lip and the housing to be supported by a dummy dome formation.

JOSEPH W. SHARP, Jr.